United States Patent Office 3,639,565
Patented Feb. 1, 1972

3,639,565
GASTRIC-RESISTANT TABLETS COATED WITH ERYTHROSINE AND HYDROXYPROPYL-ETHYLCELLULOSE
Elliott Prillig, Waukegan, Ill., assignor to Abbott Laboratories, North Chicago, Ill.
No Drawing. Filed Apr. 15, 1970, Ser. No. 28,915
Int. Cl. C08d 27/76, 27/02; C09d 11/14
U.S. Cl. 424—35                                    1 Claim

ABSTRACT OF THE DISCLOSURE

A composition consisting essentially of hydroxypropylmethylcellulose and erythrosine has been found to be substantially insoluble in gastric juices but readily soluble in intestinal juices. It therefore provides an excellent coating composition for tablets, granules and powders intended for dissolution in the intestines and for tablets, granules and powders containing a drug sensitive to the acidic environment of the stomach.

DISCLOSURE

Hydropropylmethylcellulose, hereafter referred to as HPMC, has been used for many years in the preparation of many pharmaceutical formulations, for instance, in gels, suspensions, tablet core formulations, and extensively, in tablet coatings. HPMC in a molecular weight range of between 10,000 and 360,000 is particularly suitable for this purpose but, unfortunately, does not provide the active ingredients of tablets with the protection necessary when such ingredients are sensitive to acids. HPMC is therefore unsuitable as a film-forming base for pharmaceutical tablets in which the active ingredients or any other part of the core are adversely affected by the presence of acids.

In the past, HPMC has often been used in combination with other film-forming materials in order to decrease the solubility of the coating made from this polymer alone. For instance, in U.S. 2,887,440, a combination of HPMC and ethylcellulose is provided to produce a drug-release retardation. Other coating compositions used in the past encompass insoluble additives to prevent premature dissolution of the tablet core or they use a single polymeric material which is essentially insoluble in the gastric juices. Many of these formulations are not suitable for pharmaceutical tablets because they do not clearly provide for disintegration of the coating in the intestines. It is therefore an object of the present invention to provide a coating composition which is resistant to the gastric juices and readily dissolves in the intestinal juices; it is a further object of the present invention to provide an enteric coating for pharmaceutical tablets, granules and powders which assures prompt dissolution of the coating in the intestines; it is an additional object of this invention to provide a fluid coating mixture which can readily be applied by standard techniques to pharmaceutical tablets, granules and powders.

These and other objects are accomplished by providing a coating composition consisting essentially of HPMC and erythrosine (sodium tetraiodofluorescein, more commonly known as F.D. & C. Red No. 3) and a low-boiling solvent or solvent mixture, with the erythrosine being present in an amount of between 0.5 and 50% of said HPMC. The amount of solvent or solvent mixture can vary within a wide range but preferably, the coating solution contains between 1 and 10% of the above solids. Suitable low boiling solvents include methanol, ethanol, propanol, methylene chloride, chloroform, water and the like or mixtures thereof. A particularly useful solvent system consists of 40–60% methylene chloride and 60–40% of ethyl alcohol. Obviously, this mixture may contain other inert materials to a minor extent, e.g., other dyes, lakes or pigments, flavoring agents, and the like. Of course, it is to be understood that all reference herein to erythrosine also includes the meaning wherein said dye is present in form of its lake.

The above mixture can be provided in the form of a concentrate to which an additional solvent or solvents are added to result in a suitable viscosity for the particular coating process used or it can be initially prepared in a viscosity range suitable for use in the available coating equipment. The mixture can be applied to tablets in the standard fashion, e.g., dip coating, pan coating or by suspension coating, the latter also being applicable to granules and powders.

Materials coated in this fashion may optionally be further processed by applying a gloss coating, polish or sugar coating by standard techniques; for instance, a coating step using essentially only HPMC containing no dyes or pigments may follow the application of the present coating. Of course, such additional steps should not change or alter the dissolution of the coating of the present invention, i.e., such an additional coating should be readily soluble.

Materials coated in the above fashion are resistant to the gastric juices of the alimentary channel and are essentially impervious to liquids of a pH of below about 5.5. However, the films applied to tablets, powders and granules with the above coating composition readily dissolve at a pH of above 7 and therefore offer no resistance to the juices in the intestines. The present invention thus provides an excellent means for enteric coating of medicaments sensitive to gastric juices and can be used for proper release timing of orally administered drugs by providing the proper thickness of the now coating. For ordinary protection toward the acidic passage of the alimentary channel, a coating thickness of between 0.05 and 0.1 mm. is sufficient.

In order to illustrate the manufacture and use of the new tablet coating composition, reference is made to the following examples which are, however, not intended to limit the scope of the present invention in any fashion.

EXAMPLE 1

HPMC of 50 cps. viscosity and F.D. & C. Red No. 3 were mixed in various ratios and dissolved in a mixture of 55% by volume of methylene chloride and 45% by volume of ethanol. Free films were prepared by casting the solution on glass plates with a Gardner Applicator (Gardner Laboratory Inc., Bethesda, Md.). After drying, the films were removed from the glass plates and cut into uniform size discs with a 21 mm. diameter cork borer. The thickness of each disc was measured with a micrometer prior to testing; the average thickness was 0.06 mm.

The film pieces were individually placed in beakers containing artificial gastric juices, artificial intestinal juices, or deionized water. All film compositions were made from a mixture of 2% by weight of HPMC, dissolved in a mixture of 45% by volume of ethanol and 55% by volume of methylene chloride but contained different amounts of erythrosine. The following dissolution rates were observed.

| Erythrosine | Gastric juice | Intestinal juice | Water |
|---|---|---|---|
| 10 g./l | Insoluble | Dissolved in 10 min | Dissolved in 5 min. |
| 5 g./l | do | Dissolved in 14 min | Do. |
| 2 g./l | do | do | Do. |

All tests were performed at 37° C. under light agitation by a magnetic stirrer.

When using erythrosine lake at 5 g./l. in the same experiment, the films disintegrated in gastric juice without dissolving, dissolved in 10 minutes in intestinal fluid and disintegrated immediately in water wherein they dissolved in 28 minutes.

EXAMPLE 2

Films cast in the manner of Example 1 using 0.5% weight/volume of erythrosine and 5.0% weight/volume of HPMC in water with an average film thickness of 0.06 mm. were placed in beakers containing 150 ml. of various test fluids. The test fluids were lightly agitated by a magnetic stirrer at a temperature of 37° C.

With simulated gastric fluid of pH 1.2, the films remained undissolved for >60 minutes although they disintegrated into relatively large pieces; in simulated intestinal fluid of pH 7.4, the films dissolved within 3–6 minutes and when the test liquid was deionized water of pH 6.5, the films also dissolved within 3–6 minutes.

EXAMPLE 3

Films were prepared in the manner described in Example 1 from mixtures of 3.0% weight/volume of HPMC, 0.1% weight/volume of erythrosine and a solvent mixture of methylene chloride/ethanol 55:45 volume/volume. These films remained completely insoluble in simulated gastric fluid but dissolved within 3–6 minutes in water and artificial intestinal fluid.

EXAMPLE 4

Multivitamin tablets coated with HPMC/erythrosine films of the composition shown in Example 3 by the air-suspension coating technique to a thickness of 0.08 mm. were placed in lightly agitated simulated gastric or intestinal juices at 37° C. The vitamins resisted disintegration for 45 minutes in gastric fluid but disintegrated within 27 minutes in intestinal fluids. Control tablets containing no erythrosine disintegrated in gastric fluid within 18 minutes and in intestinal fluid within 24 minutes. These latter values are almost identical to those obtained when no coating is applied to the tablets in which case the corresponding values were 14 minutes and 21 minutes, respectively.

EXAMPLE 5

Riboflavin tablets coated with the mixture described in Example 4, corresponding uncoated tablets, and tablets coated in the same fashion with HPMC containing no dye were tested in the manner described in Example 4. The following table shows the average time required for 50% of the tablets' drug to dissolve in the test liquids.

|  | Simulated gastric fluid, pH 1.2 | Simulated intestinal fluid, pH 7.4 |
|---|---|---|
| Uncoated | Dissolves in 9 min. | Dissolves in 16.5 min. |
| Coated with HPMC | Dissolves in 14.5 min. | Dissolves in 19.5 min. |
| Coated with HPMC and erythrosine. | Dissolves in 23 min. | Do. |

EXAMPLE 6

Riboflavin tablets coated as described in Example 4 and similar tablets coated only with HPMC were administered to adult subjects and urine samples were collected and assayed over a period of 24 hours. The excretion levels of these subjects had previously been established by the administration of riboflavin tablets having a rapid disintegration and dissolution rate.

With the tablets coated by the composition of the present invention to a coating thickness of 0.08 mm. in a suspension coating apparatus (column diameter 15.24 cm.; solvent mixture containing coating materials added by a pneumatic atomizing system; temperatures: inlet 60° C., exit 33° C.), 63% of the riboflavin was excreted while the control tablets, coated with HPMC only, provided excretion levels of 96% in 24 hours.

As seen from the above examples, the new coating composition protects the tablet core to which it is applied through the acid passage of the gastro-intestinal tract while it does not unduly retard the exposure of the drug in the intestines. In this respect, the choice of erythrosine is unique and therefore the new result is surprising; no other commonly used pharmaceutically acceptable dye produces this phenomenon although other dyes appear to produce a higher viscosity of the fluid coating mixture containing HPMC when added thereto.

The composition of the present invention is also unique in that a water soluble, acid soluble, simple film-forming material can be used for the protection of medicaments through the gastric passage by the simple use of a pharmaceutically-acceptable dye. In other words, no retarding agent or other additive is required except erythrosine which, at the same time, produces a desirable coloration or, an elegant tablet. Of course, it is to be understood that not all tablets, granules or powders produced with the present coating composition have to be red: other soluble dyes or inert pigments can be added to alter the color or, a material coated with the present composition may be subsequently coated with a water-soluble coating composition containing different colorants. The use of HPMC is particularly advantageous because it is easy to handle: it is soluble in many commonly used, inexpensive solvents or solvent systems. The present position also is applicable in all standard coating techniques and is stable to storage for extended periods of time.

I claim:
1. A coated solid medicament having as the coating material a gastric-resistant film consisting essentially of hydroxypropylmethylcellulose and erythrosine, said erythosine being present in an amount of between 0.5 and 50% by weight of said hydroxypropylmethylcellulose.

References Cited

UNITED STATES PATENTS

| 2,887,440 | 5/1959 | Grbminger et al. | 424—35 |
| 3,256,111 | 6/1966 | Singiser | 424—35 X |
| 3,371,015 | 2/1968 | Sjogren et al. | 424—35 X |
| 3,383,236 | 5/1968 | Brindamour | 424—35 X |
| 3,388,041 | 6/1968 | Gans et al. | 424—35 X |
| 3,475,187 | 10/1969 | Kane | 106—22 |
| 3,476,588 | 11/1969 | Pitel | 424—35 X |
| 3,477,864 | 11/1969 | Tuji | 106—151 |

SHEP K. ROSE, Primary Examiner

U.S. Cl. X.R.

106—22, 193; 424—7